April 19, 1927.
A. E. ANDERSON
1,625,582
FLEXIBLE HOLLOW ARTICLES AND METHOD OF MAKING THE SAME
Filed Nov. 10, 1924
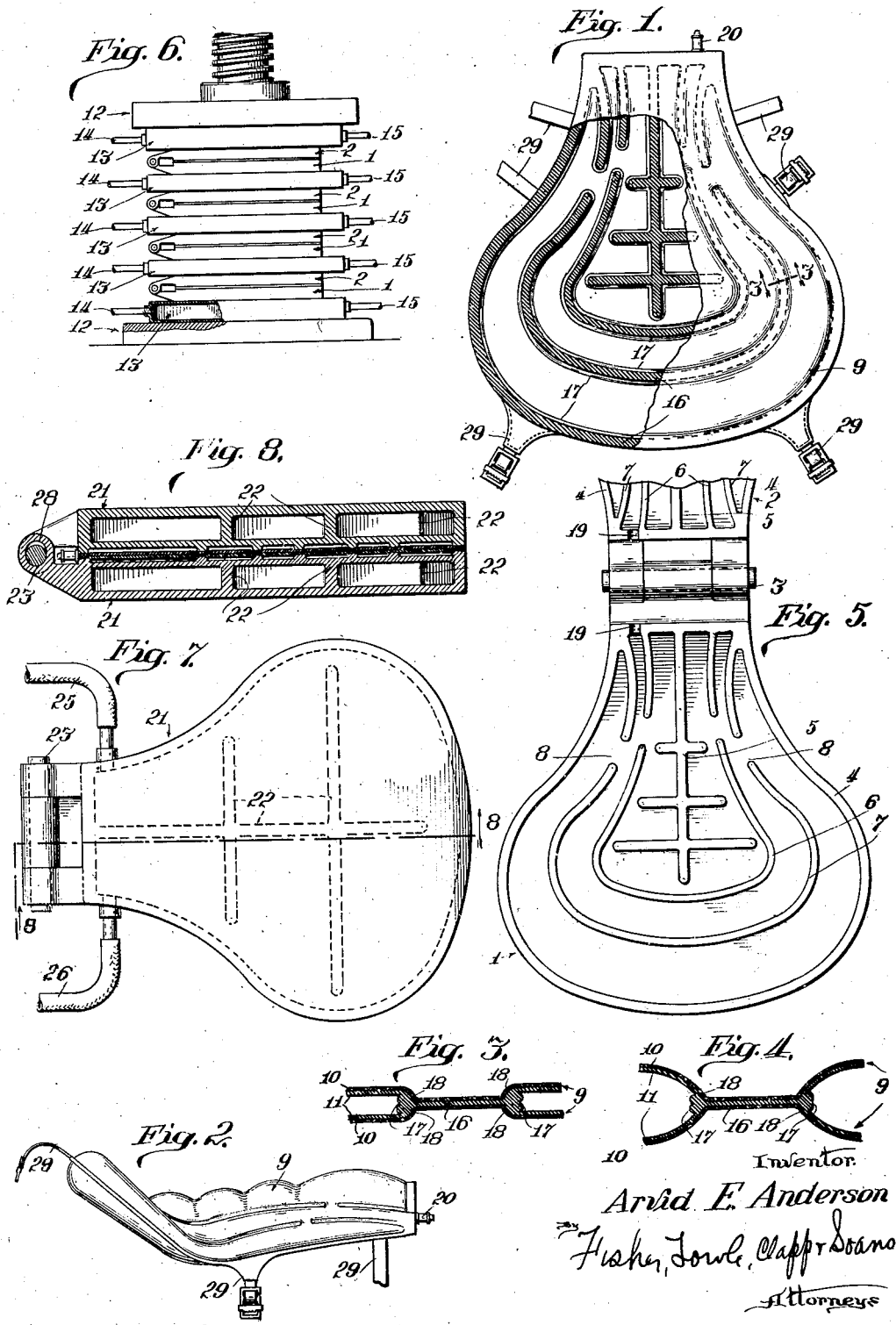
Inventor
Arvid E. Anderson
by Fisher, Fowle, Clapp & Soans.
Attorneys Patented Apr. 19, 1927.

1,625,582

UNITED STATES PATENT OFFICE.

ARVID E. ANDERSON, OF CHICAGO, ILLINOIS, ASSIGNOR TO AIRUBBER CORPORATION, OF CHICAGO, ILLINOIS, A CORPORATION OF ILLINOIS.

FLEXIBLE HOLLOW ARTICLES AND METHOD OF MAKING THE SAME.

Application filed November 10, 1924. Serial No. 748,881.

This invention relates to flexible hollow articles and the making of the same, and has for one of its objects to provide a new and improved article of this character having its side walls united in a strong and durable manner around the periphery thereof and also at limited areas within the periphery thereof.

A further object of the invention is to provide for making the article from blanks of flexible material having unvulcanized rubber faces, and to provide for uniting the rubber faces of the blanks in vulcanized joints around the periphery of the article and at limited areas within the periphery of the article in a simple and inexpensive manner and with or without the use of a core separating the sheets of material during the uniting of the faces thereof.

According to the present invention rubber faced cloth is employed, and in the production of the joints uniting the sheets, portions of the rubber faces are forced into the interstices of the cloth sheets so as to become incorporated therein and increase the strength of the joint.

The present application is a continuation in part of my copending application, Serial No. 649,710, filed July 5, 1923.

On the drawings:

Fig. 1 is a top view of a cushion constructed in accordance with my invention, with a portion of the top wall removed to disclose details of the construction;

Fig. 2 a side or edge view of the cushion of Fig. 1, in the inflated condition.

Fig. 3 an enlarged sectional view on the line 3—3 of Fig. 1, showing the joint for connecting the upper and lower walls of the casing;

Fig. 4 a similar view, showing the position of the parts when the casing is inflated;

Fig. 5 a fragmentary top view of a mold for forming the cushion;

Fig. 6 a side view of a number of molds arranged in a press for vulcanizing cushions in accordance with my invention;

Fig. 7 a top view of a modified form of mold; and

Fig. 8 a sectional view thereof, taken on the line 8—8 of Fig. 7.

In carrying out my invention I employ a sheet of cloth or fabric having a coating of uncured rubber compound on one side. Two pieces of the material are cut in substantially the form and size of the article which is to be made therefrom, and these pieces are superposed with their rubber surfaces adjoining and clamped in a mold. This mold is formed so as to press together corresponding areas of the two sheets, around the edges and at inward points if required, and subjected to a vulcanizing temperature. The pressure employed is sufficient so that as the rubber reaches a vulcanizing temperature, the pressed together portions of the two sheets are consolidated into a unitary mass, and the high pressure forces the rubber into the interstices of the fabric at the joint and also extrudes excess rubber outwardly along the edges of the joint and forms a reinforcing fillet connecting the portions of the two layers of rubber immediately adjoining the area of compression. Ordinarily no special precaution is required to prevent the uncompressed areas of rubber, or the portions which are not clamped between the ribs, from sticking together as heavy pressure is required to effect the consolidation, but if found necessary a very light dusting of material such as talc may be applied to one or both of the rubber surfaces to avoid any possibility of the rubber parts sticking together at points where they are required to remain separate.

Referring to the drawings, which it is to be understood are merely illustrative of one of the many applications of my invention, the reference numeral 1 indicates one section of a mold for making a bicycle or motorcycle seat and 2 the other sections of said mold, said sections being substantially of the same form as the seat which is to be made, and preferably hinged together as at 3, so as to fold together to clamp the sheets of material of which the cushion is composed therebetween. The places at which the sheets are to be joined together are determined by ribs or raised places on one or both of the mold sections. In the present case, both sections 1 and 2 are ribbed, said ribs being correspondingly arranged and comprising an outer rib 4 extending entirely around the edge of the mold section, an inner rib formation 5, and intermediate ribs 6 and 7, these latter being interrupted at points as indicated at 8, so that the sheets will not be joined together at these points but will leave passage for intercommunication between the separate cells or compartments of the cushion. The ribs are beveled off slightly on their edges for a purpose which will later appear.

Two similar sheets 9 of the material of which the cushion is to be made and each preferably comprising a fabric 10 with a rubber coating or layer 11 of rubber adhering to one side, are cut substantially in the form of the mold section 1 or 2 and they are then arranged in superposed position with the rubber faces contacting. They are then placed in the mold 1—2 and the two sections of the mold closed together to confine the sheets 9—9 therebetween.

In practice I prefer to prepare a number of molds with the sheets therein as above described, and then place the molds in a suitable press 12 as shown in Fig. 6, with a hollow casing 13 at each side of each mold and operate the press to compress the molds and the sheets of material therebetween. Any suitable pressure which will serve to consolidate the portions of the rubber of the sheets which are between the ribs of the sections 1 and 2, may be employed. However, I have found that a pressure of substantially 200 pounds per square inch of rib face is sufficient.

The casings 13 are provided with connections 14 and 15 for steam, and while the units in the press are under the proper compression, steam is admitted to the casings 13 and the molds heated thereby so as to vulcanize or cure the rubber. In this operation the high pressure to which the compressed portions of the rubber are subjected, causes the rubber portions of the two sheets 9 directly between the corresponding ribs 4—5—6 and 7 of the two mold sections to consolidate, and presses the consolidated mass of rubber into a unitary thin skin 16 between the two fabrics 10 and the rubber is forced into the interstices of the fabric so that the thin skin 16 of the rubber is thoroughly and securely bonded to the corresponding areas of the upper and lower fabrics. Moreover, the compressing of the consolidated mass of rubber by the employment of the high pressure of substantially 200 pounds per square inch causes the excess rubber to be extruded outwardly from between the ribs of the mold, and this extruded rubber forms a fillet 17 along the edge of the joint between portions of the upper and lower sheets, which are thereby spread apart somewhat as indicated at 18 in Fig. 3, and this fillet 17 forms a connection between the spread apart or divergent portions 18, which reinforces the joint and makes the cushion capable of withstanding unusually high internal pressure. It will be noted that the fillet 17 is a double fillet in that it is formed from the material extruded from the rubber faces of both sheets, and therefore this double or composite fillet is of material bulk and constitutes a reenforcement and adds materially to the strength of the connection between the rubber of the joint and the rubber faces of the two sheets. The beveled edges of the opposed ribs mate to form a mold for this fillet.

The ribs 4 of the mold sections 1 and 2 are preferably cut away as indicated at 19, adjacent the hinge 3 to accommodate a valve 20 which is inserted between the edges of the sheets 9 before the mold is closed, and this valve becomes permanently attached to the cushion in the vulcanizing operation and serves as a means for inflating the cushion.

Instead of using the molds such as shown in Figs. 5 and 6 and the separate steam casings 13, the molds and steam casings may be combined in a single unit as shown in Figs. 7 and 8. In the structure of these two figures, the mold consists of the two flat hollow casings 21, which are suitably reinforced to withstand the high pressure to which they are subjected, by ribs 22 which are interposed between the upper and lower walls thereof, said ribs being terminated at a distance from the marginal walls of the casings so as to afford intercommunication between all parts of the interior of the casing, and these casings are hinged together as at 23, so as to fold together in the same manner as the mold sections 1 and 2. The inner surfaces of the casings 21 are provided with ribs around the edge and at intermediate points similar to the ribs 10, 13, 14 and 15 respectively, shown in Fig. 5, for compressing portions of rubberized sheets therebetween so as to connect the sheets around their edges and at intermediate points as shown in the structure of Fig. 1. Steam connections 25 and 26 are provided for each of the casings 21 and are preferably composed in part of flexible tubing which permits the necessary manipulation of the molds. These molds, after the sheets have been placed in position therebetween, are placed in a press of any suitable type in superposed relation, so that the sheets of material between the casings 21 are suitably compressed to cause the proper bonding of the two sheets along the ribs, and steam is admitted to the interior of the casings 21 and the sheets vulcanized together in the same manner as when the molds 1—2 and steam casings 13 are employed.

The apertures in one of the casings 21, through which the hinge pin 23 is passed, are preferably elongated somewhat in an up and down direction as indicated at 28 in Fig. 8, to afford sufficient play to permit free clamping movement of the casings 21, and the hinge connection 3 of the molds shown in Fig. 5 is also similarly formed for the same purpose.

As stated hereinbefore, the ribs may be formed on only one of the members of the mold if desired, and the other mold section may be left flat. However, I prefer to employ molds having ribs on the inner surfaces of both members thereof, and merely wish it to be understood that my invention contemplates the use of ribs on only one or both of the members of the mold. Straps or connectors 29 may be attached to the edge of the pad if required by merely inserting same between the sheets 9 and vulcanizing them in place as the sheets 9 are vulcanized together.

From the foregoing it will be observed that I have provided a simple and inexpensive method of forming or making an air pad or similar article, and the air pad which is thus formed is exceedingly strong on account of the bonding of the fabric of the two sheets of material at the joints and especially on account of the reinforcing fillet which is formed along the edges of the joints and connects the divergent portions of the casing walls along the edges of the joints.

While I have shown and described my invention in a preferred form, I am aware that various changes and modifications may be made without departing from the principles of my invention, the scope of which is to be determined by the appended claims.

I claim as my invention:

1. The method of making hollow articles, which consists in cutting sheets having faces of unvulcanized rubber to blanks of the desired size and shape, placing said blanks with their rubber faces face to face, and applying a vulcanizing heat to the blanks and simultaneously applying pressure to the exteriors of the blanks along the peripheries thereof and compressing the rubber faces and uniting the same in a vulcanized joint of less thickness than the combined thickness of the two blanks around the periphery of the article and along the line of pressure applied thereto.

2. The method of making hollow articles, which consists in cutting sheets having faces of unvulcanized rubber to blanks of the desired size and shape, placing said blanks with their rubber faces face to face, and, in the absence of a core, applying a vulcanizing heat to the blanks and simultaneously applying pressure to the exteriors of the blanks along the peripheries thereof and compressing the rubber faces and uniting the same in a vulcanized joint of less thickness than the combined thickness of the two blanks around the periphery of the article and along the line of pressure applied thereto.

3. The method of making hollow articles, which consists in cutting sheets having faces of unvulcanized rubber to blanks of the desired size and shape, placing said blanks with their rubber faces face to face, and applying a vulcanizing heat to the blanks and simultaneously applying pressure to the exteriors of the blanks along the peripheries thereof and also to restricted areas within the peripheries of the blanks and compressing the rubber faces and uniting the same in vulcanized joints of less thickness than the combined thickness of the two blanks in the areas subjected to pressure.

4. The method of making hollow articles, which consists in cutting sheets having faces of unvulcanized rubber to blanks of the desired size and shape, placing said blanks with their rubber faces face to face, and applying a vulcanizing heat to the blanks and simultaneously applying pressure to the exteriors of the blanks along the peripheries thereof and compressing the rubber faces and uniting the same in a vulcanized joint of less thickness than the combined thickness of the two blanks around the periphery of the article and along the line of pressure applied thereto, said pressure extruding rubber of each face in a fillet extending along the inner edge of the peripheral joint.

5. The method of making hollow articles, which consists in cutting sheets having faces of unvulcanized rubber to blanks of the desired size and shape, placing said blanks with their rubber faces face to face, and applying a vulcanizing heat to the blanks and simultaneously applying pressure to the exteriors of the blanks along the peripheries thereof and also to restricted areas within the peripheries of the blanks and compressing the rubber faces and uniting the same in vulcanized joints of less thickness than the combined thickness of the two blanks in the areas subjected to pressure, said pressure extruding rubber of each face in a fillet along the inner edge of the peripheral joint and also along opposite edges of the other joints.

6. The method of making hollow articles, which consists in cutting cloth sheets having faces of unvulcanized rubber to blanks of the desired size and shape, placing said blanks with their rubber faces face to face, and applying a vulcanizing heat to the blanks and simultaneously applying pressure to the exteriors of the blanks along the peripheries thereof and forcing rubber of the rubber faces by said pressure into the interstices of the cloth sheets at the peripheries of the blanks and compressing and uniting the rubber faces in a vulcanized joint of less thickness than the combined thickness of the blanks in the area subjected to pressure.

7. The method of making hollow articles, which consists in cutting cloth sheets having faces of unvulcanized rubber to blanks of the desired size and shape, placing said blanks with their rubber faces face to face, and applying a vulcanizing heat to the blanks and simultaneously applying pressure to the exteriors of the blanks along the peripheries thereof and also to restricted areas within the peripheries of the blanks and forcing rubber of the rubber faces by said pressure into the interstices of the cloth sheets at the pressure areas and compressing and uniting the rubber faces in a vulcanized joint of less thickness than the combined thickness of the blanks in the area subjected to pressure.

8. The method of making hollow articles, which consists in cutting cloth sheets having faces of unvulcanized rubber to blanks of the desired size and shape, placing said blanks with their rubber faces face to face, and applying a vulcanizing heat to the blanks and simultaneously applying a pressure of substantially 200 pounds per square inch to the exteriors of the blanks along the peripheries thereof and forcing rubber of the rubber faces by said pressure into the interstices of the cloth sheets at the peripheries of the blanks and compressing and uniting the rubber faces in a vulcanized joint of less thickness than the combined thickness of the blanks in the area subjected to pressure.

9. The method of making hollow articles, which consists in cutting cloth sheets having faces of unvulcanized rubber to blanks of the desired size and shape, placing said blanks with their rubber faces face to face, and applying a vulcanizing heat to the blanks and simultaneously applying a pressure of substantially 200 pounds per square inch to the exteriors of the blanks along the peripheries thereof and on limited areas within the peripheries of the blanks and forcing rubber of the rubber faces by said pressure into the interstices of the cloth sheets at the pressure areas and compressing and uniting the rubber faces in a vulcanized joint of less thickness than the combined thickness of the blanks in the area subjected to pressure.

10. The method of making hollow articles, which consists in cutting cloth sheets having faces of unvulcanized rubber to blanks of the desired size and shape, placing said blanks with their rubber faces face to face, applying a vulcanizing heat to the blanks and simultaneously applying pressure to the exteriors of the blanks along the peripheries thereof, forcing rubber of the rubber faces by said pressure into the interstices of the cloth sheets at the peripheries of the blanks and compressing and uniting the rubber faces in a vulcanized joint of less thickness than the combined thickness of the blanks in the area subjected to pressure, said pressure extruding rubber of each face in a fillet extending along the inner edge of the peripheral joint.

11. The method of making hollow articles, which consists in cutting cloth sheets having faces of unvulcanized rubber to blanks of the desired size and shape, placing said blanks with their rubber faces face to face, applying a vulcanizing heat to the blanks and simultaneously applying pressure to the exteriors of the blanks along the peripheries thereof and on limited areas within the peripheries of the blanks, and forcing rubber of the rubber faces by said pressure into the interstices of the cloth sheets at the pressure areas and compressing and uniting the rubber faces in a vulcanized joint of less thickness than the combined thickness of the blanks in the area subjected to pressure, said pressure also extruding rubber of each face in a fillet along the inner edge of the peripheral joint and also along opposite edges of the other joints.

12. The method of making hollow articles, which consists in cutting cloth sheets having faces of unvulcanized rubber to blanks of the desired size and shape, placing said blanks with their rubber faces face to face, and applying a vulcanizing heat to the blanks and simultaneously applying a pressure of substantially 200 pounds per square inch to the exteriors of the blanks along the peripheries thereof and on limited areas within the peripheries of the blanks and forcing rubber of the rubber faces by said pressure into the interstices of the cloth sheets at the pressure areas and compressing and uniting the rubber faces in a vulcanized joint of less thickness than the combined thickness of the blanks in the area subjected to pressure, said pressure extruding rubber of each face in a fillet along the inner edge of the peripheral joint and also along opposite edges of the other joints.

13. A flexible hollow article comprising a pair of blanks having faces of rubber, the rubber faces of the blanks being disposed face to face and connected peripherally by a vulcanized joint of the rubber of the opposed faces, said joint being compressed and thinner than the combined thickness of the two sheets.

14. A flexible hollow article comprising a pair of blanks having faces of rubber, the rubber faces of the blank being disposed face to face and connected peripherally and also on limited areas within the peripheries of the blanks by vulcanized joints of the rubber of the opposed faces of the sheets, the joint portions of the sheets being compressed and thinner than the combined thickness of the two sheets.

15. A flexible hollow article comprising a pair of blanks having faces of rubber, the rubber faces of the blanks being disposed face to face and connected peripherally by a vulcanized joint of the rubber of the opposed faces, said joint being compressed and thinner than the combined thickness of the two sheets, and fillets of rubber extruded from the rubber faces of the blanks and connecting the rubber of the joint with the rubber faces of the respective blanks.

16. A flexible hollow article comprising a pair of blanks having faces of rubber, the rubber faces of the blanks being disposed face to face and connected peripherally and also on limited areas within the peripheries of the blanks by vulcanized joints of the rubber of the opposed faces of the sheets, the joint portions of the sheets being compressed and thinner than the combined thickness of the two sheets, and fillets of rubber extruded from the rubber faces of the blanks and extending along the inner edge of the peripheral joint and also along the opposite edges of the other joints and connecting the rubber of the joints with the rubber faces of the respective blanks.

17. A flexible hollow article comprising a pair of cloth blanks having faces of rubber, the rubber faces of the blanks being disposed face to face and connected peripherally by a vulcanized joint of the rubber of the opposed faces, said joint being compressed and thinner than the combined thickness of the two blanks, and rubber of the rubber faces of the two blanks being incorporated in the interstices of the cloth along the joint.

18. A flexible hollow article comprising a pair of cloth blanks having faces of rubber, the rubber faces of the blanks being disposed face to face and connected peripherally and also along limited areas within the peripheries of the blanks by vulcanized joints of the rubber of the opposed faces of the blanks, the joint portions of the blanks being compressed and thinner than the combined thickness of the two blanks, and rubber of the rubber faces of the two blanks being incorporated in the interstices of the cloth along the joints.

19. A flexible hollow article comprising a pair of cloth blanks having faces of rubber, the rubber faces of the blanks being disposed face to face and connected peripherally by a vulcanized joint of the rubber of the opposed faces, said joint being compressed and thinner than the combined thickness of the two blanks, rubber of the rubber faces of the two blanks being incorporated in the interstices of the cloth along the joint, and fillets of rubber extruded from the rubber faces of the blanks and connecting the rubber of the joint with the rubber faces of the respective blanks.

20. A flexible hollow article comprising a pair of cloth blanks having faces of rubber, the rubber faces of the blanks being disposed face to face and connected peripherally and also on limited areas within the peripheries of the blanks by vulcanized joints of the rubber of the opposed faces of the blanks, the joint portions of the sheets being compressed and thinner than the combined thickness of the two blanks, rubber of the rubber faces of the two blanks being incorporated in the interstices of the cloth along the joints, and fillets of rubber extruded from the rubber faces of the blanks and extending along the inner edge of the peripheral joint and also along the opposite edges of the other joints and connecting the rubber of the joints with the rubber of the respective blanks.

ARVID E. ANDERSON.